(12) United States Patent
Wood

(10) Patent No.: US 10,343,052 B2
(45) Date of Patent: Jul. 9, 2019

(54) ELECTRIC SKATEBOARD WITH STRAIN-BASED CONTROLS AND METHODS

(71) Applicant: Daniel James Wood, Camas, WA (US)

(72) Inventor: Daniel James Wood, Camas, WA (US)

( * ) Notice: Subject to any disclaimer, the term of this patent is extended or adjusted under 35 U.S.C. 154(b) by 0 days.

(21) Appl. No.: 15/828,347

(22) Filed: Nov. 30, 2017

(65) Prior Publication Data

US 2018/0147478 A1 May 31, 2018

Related U.S. Application Data

(60) Provisional application No. 62/427,832, filed on Nov. 30, 2016.

(51) Int. Cl.
| | | |
|---|---|---|
| *A63C 17/12* | (2006.01) |
| *A63C 17/01* | (2006.01) |
| *B60L 15/20* | (2006.01) |
| *G01L 5/22* | (2006.01) |
| *B60L 7/10* | (2006.01) |
| *B60L 50/50* | (2019.01) |
| *B60L 50/20* | (2019.01) |

(52) U.S. Cl.
CPC ............ *A63C 17/12* (2013.01); *A63C 17/012* (2013.01); *B60L 7/10* (2013.01); *B60L 15/20* (2013.01); *B60L 50/20* (2019.02); *B60L 50/50* (2019.02); *G01L 5/225* (2013.01); *A63C 2203/12* (2013.01); *A63C 2203/18* (2013.01); *B60L 2200/20* (2013.01); *B60L 2220/42* (2013.01); *B60L 2240/421* (2013.01); *B60L 2240/423* (2013.01)

(58) Field of Classification Search
CPC ....... A63C 17/01; A63C 17/12; A63C 17/012; A63C 2203/12; A63C 2203/18; A63C 2203/24
See application file for complete search history.

(56) References Cited

U.S. PATENT DOCUMENTS

| | | | | |
|---|---|---|---|---|
| 6,050,357 | A * | 4/2000 | Staelin | A63C 17/004 |
| | | | | 180/181 |
| 7,138,774 | B2 * | 11/2006 | Negoro | A63C 17/0046 |
| | | | | 318/139 |
| 2006/0213711 | A1 * | 9/2006 | Hara | A63C 17/0033 |
| | | | | 180/181 |
| 2014/0262574 | A1 * | 9/2014 | Rodgers | A63C 17/12 |
| | | | | 180/167 |
| 2017/0165561 | A1 * | 6/2017 | Rogers | A63C 17/12 |
| 2017/0252638 | A1 * | 9/2017 | Ulmen | A63C 17/12 |
| 2017/0274271 | A1 * | 9/2017 | Sugata | A63C 17/011 |
| 2018/0099207 | A1 * | 4/2018 | Doerksen | A63C 17/0046 |

* cited by examiner

*Primary Examiner* — Brian L Swenson
(74) *Attorney, Agent, or Firm* — Kolitch Romano LLP

(57) ABSTRACT

An electric weight sensing skateboard using one or more strain gauge systems to detect rider-induced strain on one or both trucks, an inertial sensor to detect accelerations and balance position, and wheel speed sensors. Throttle is controlled by rider position, for example, lean forward to increase speed, lean back to slow down. Several drive methods include a rider position detection velocity setpoint control, torque setpoint control, and direct velocity/torque control. A throttle remote is not required. Rider weight activates the motors.

18 Claims, 18 Drawing Sheets

US 10,343,052 B2

ELECTRIC SKATEBOARD WITH STRAIN-BASED CONTROLS AND METHODS

CROSS-REFERENCES

This application claims the benefit under 35 U.S.C. § 119(e) of the priority of U.S. Provisional Patent Application Ser. No. 62/427,832 (filed Nov. 30, 2016), the entirety of which is hereby incorporated by reference for all purposes.

INTRODUCTION

The popularity of electric skateboards has grown considerably over the past several years. Many companies have entered this market, with slightly differing designs. Generally speaking, these vehicles require a handheld remote, lack the ability to sense the rider's body position to control the throttle and detect the rider, and have suffered from various issues, such as safety and reliability problems related to requiring the rider to manually control the throttle with a handheld remote, and a lack of rider-on detection, and a lack of ability to reduce drivetrain drag when the rider is manually pushing. A need exists for a more intuitive, reliable, safer control system for these electric vehicles.

DESCRIPTION

Various aspects and examples of an electric skateboard having strain-based controls, as well as related methods, are described below and illustrated in the associated drawings. Unless otherwise specified, an electric skateboard in accordance with the present teachings, and/or its various components, may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Examples, Components, and Alternatives

The following sections describe selected aspects of exemplary electric skateboards, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Electric Weight Sensing Skateboard:

Electric skateboards according to the present teachings overcome the issues described above by using one or more strain gauge systems to detect rider-induced strain on one or both trucks (wheel/axle assemblies), an inertial sensor to detect accelerations and balance position, and wheel speed sensors.

Figure 9:
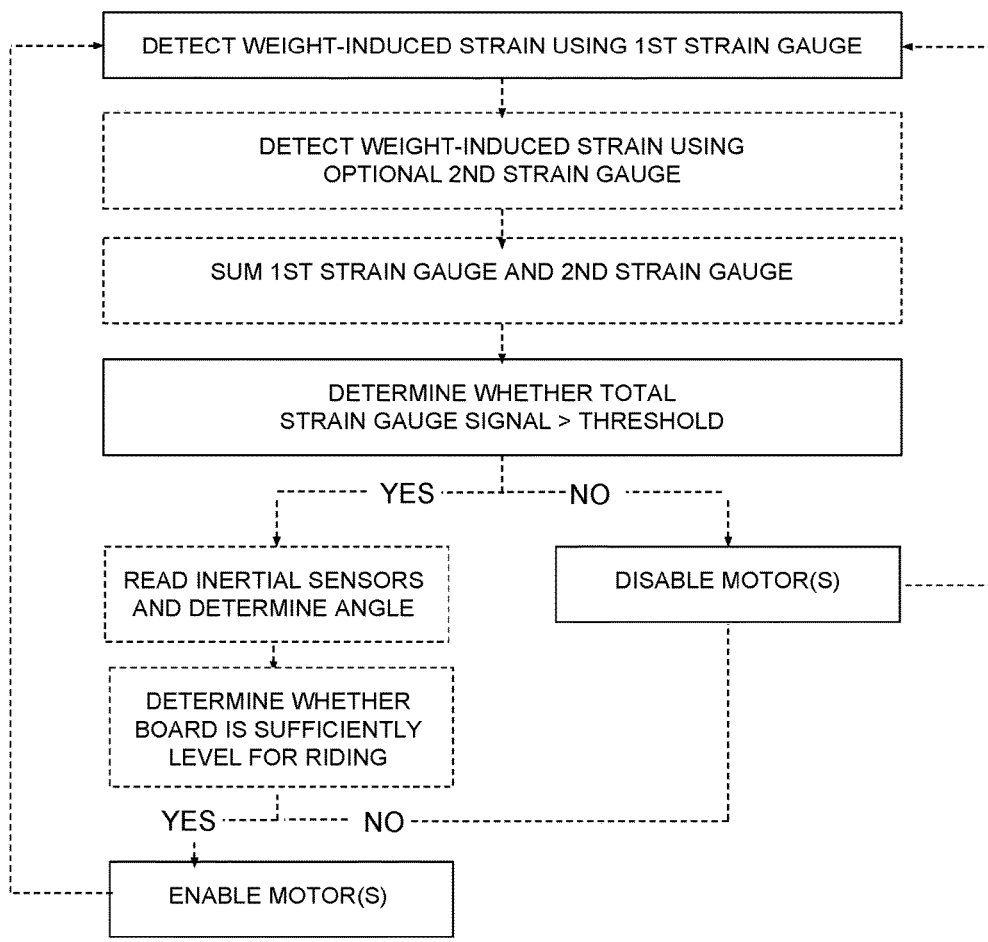
FIG. 9 is a flow chart depicting steps in an illustrative method for rider detection in accordance with aspects of the present disclosure.
Figure 10:
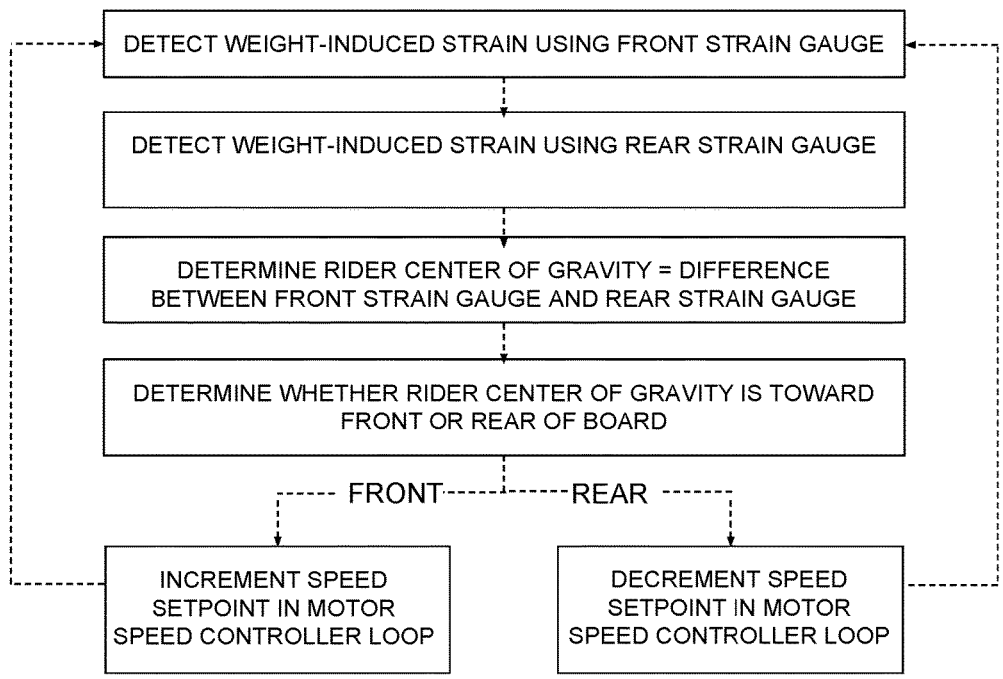
FIG. 10 is a flow chart depicting steps in an illustrative method for controlling vehicle throttle with a DUAL STRAIN GAUGE SPEED CONTROLLER.
Figure 11:
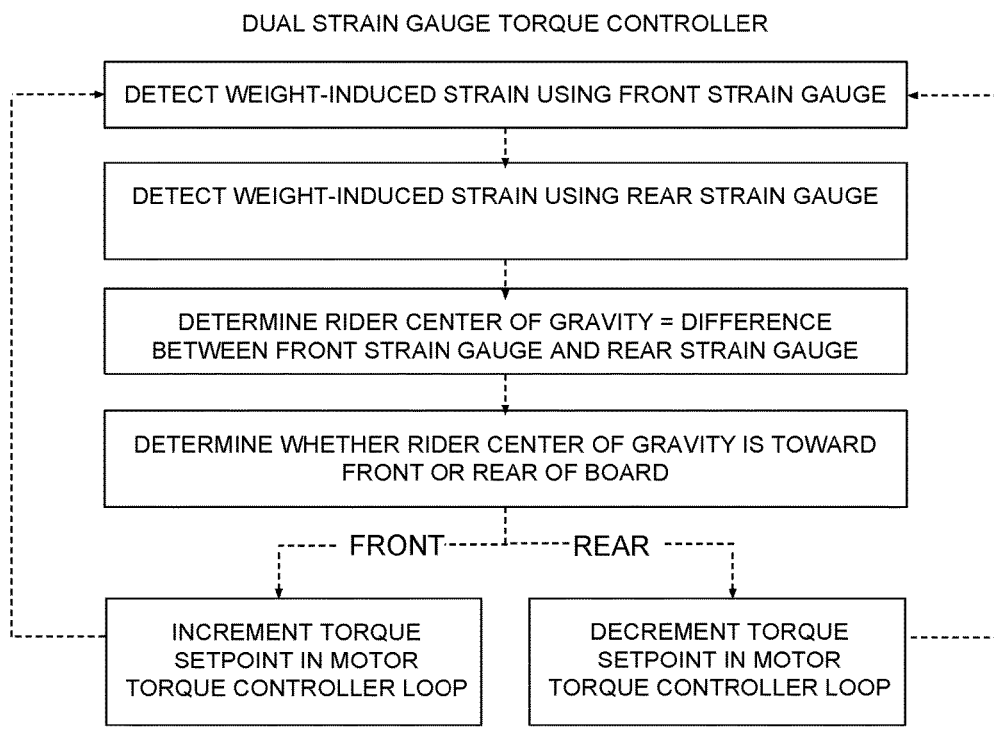
FIG. 11 is a flow chart depicting steps in an illustrative method for controlling vehicle throttle with a DUAL STRAIN GAUGE TORQUE CONTROLLER.
Figure 12:
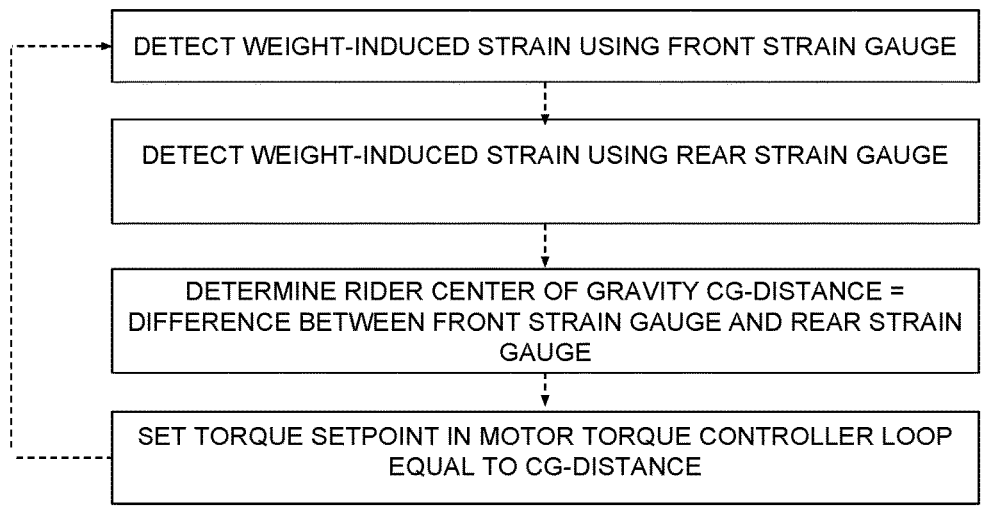
FIG. 12 is a flow chart depicting steps in an illustrative method for controlling vehicle throttle with a DUAL STRAIN GAUGE DIRECT TORQUE CONTROLLER.
Figure 13:
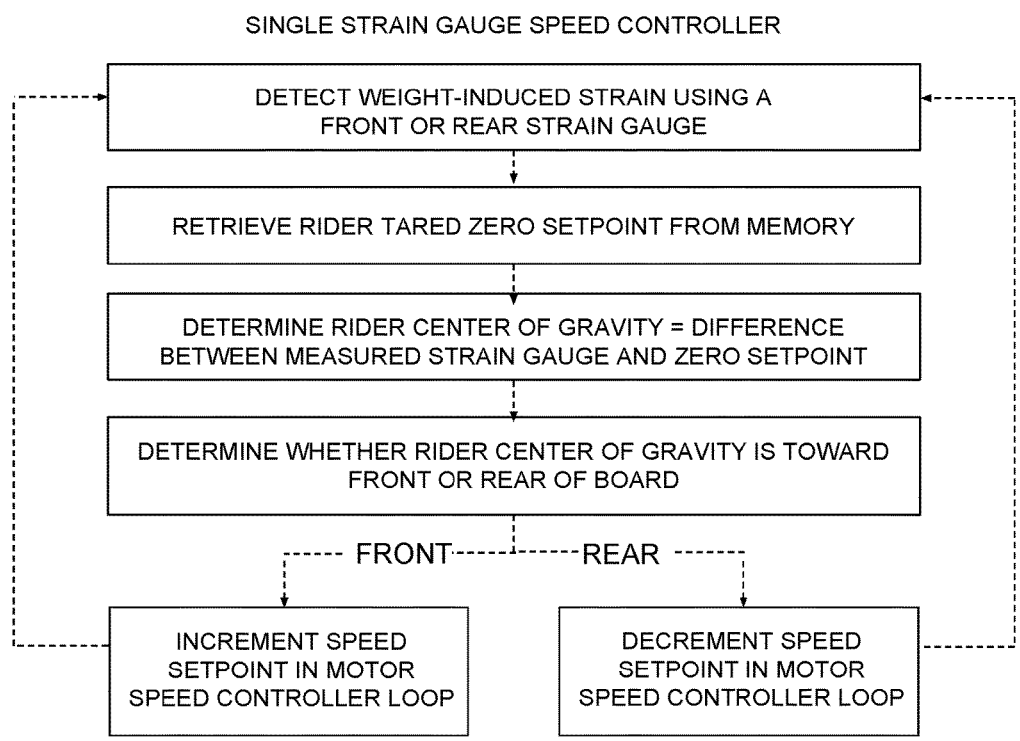
FIG. 13 is a flow chart depicting steps in an illustrative method for controlling vehicle throttle with a SINGLE STRAIN GAUGE SPEED CONTROLLER.
Figure 14:
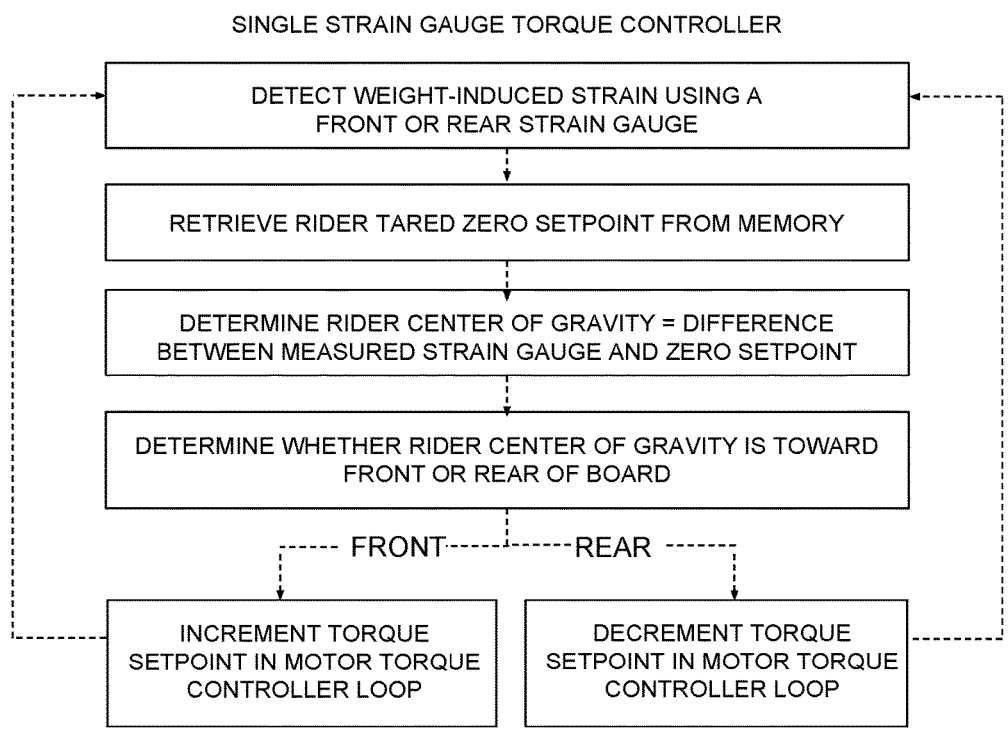
FIG. 14 is a flow chart depicting steps in an illustrative method for controlling vehicle throttle with a SINGLE STRAIN GAUGE TORQUE CONTROLLER.
Figure 15:
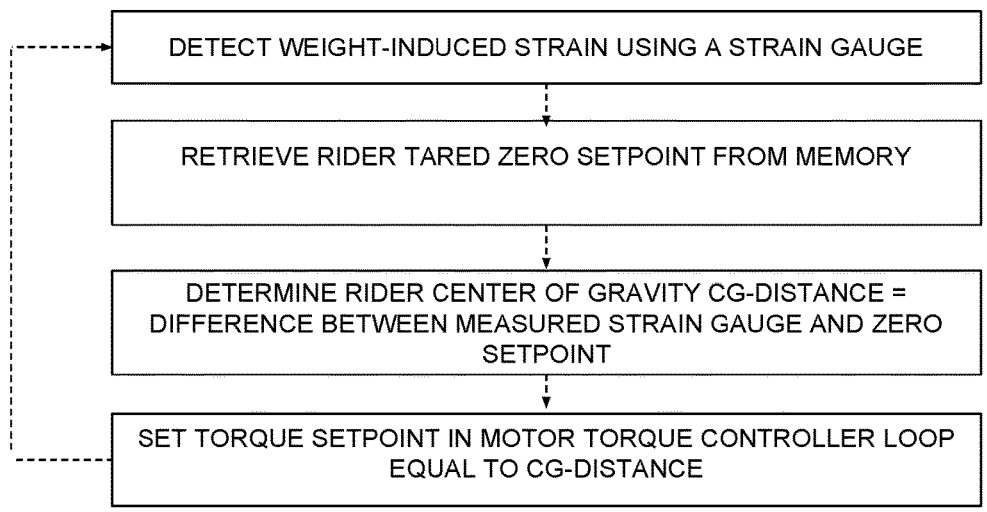
FIG. 15 is a flow chart depicting steps in an illustrative method for controlling vehicle throttle with a SINGLE STRAIN GAUGE DIRECT TORQUE CONTROLLER.
Figure 16:
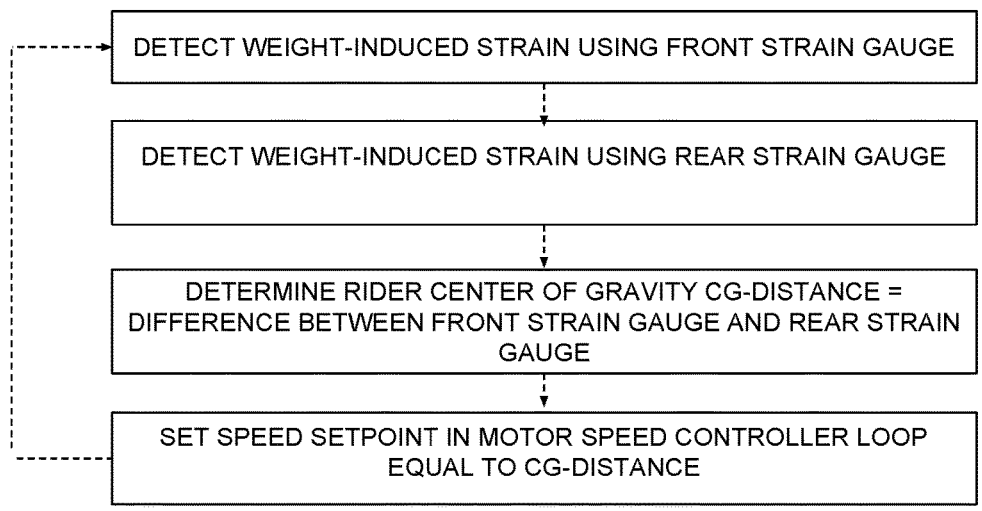
FIG. 16 is a flow chart depicting steps in an illustrative method for controlling vehicle throttle with a DUAL STRAIN GAUGE DIRECT VELOCITY CONTROLLER.
Figure 17:
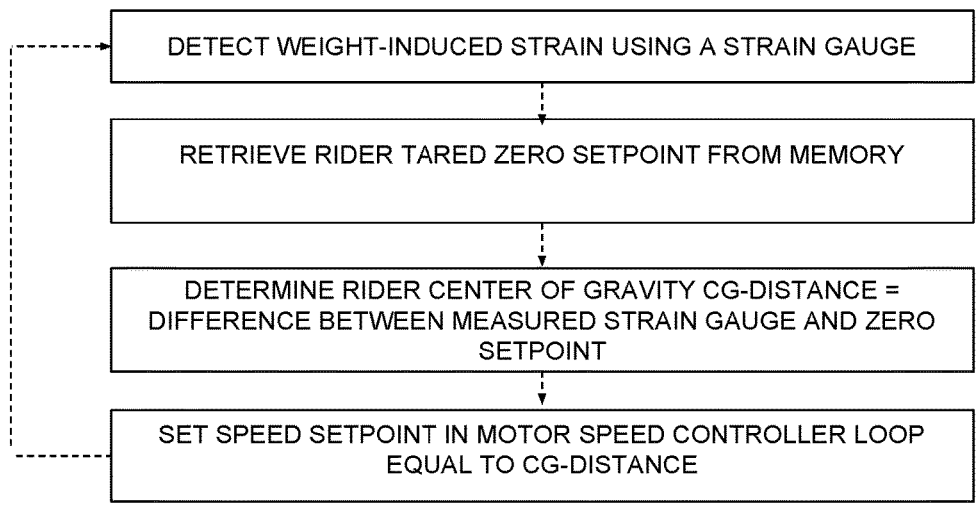
FIG. 17 is a flow chart depicting steps in an illustrative method for controlling vehicle throttle with a SINGLE STRAIN GAUGE DIRECT VELOCITY CONTROLLER.

The present disclosure provides systems, apparatuses, and methods relating to electric skateboards. In some embodiments, electric skateboards may include:

A skateboard (FIG. 1-4) including a deck 101 to receive the feet of a rider; one (or multiple) motors 102 (bldc hub motors or external belt driven motors) and motor controller 103 and battery 105 and wheels 104 disposed on front skateboard truck 106 and rear skateboard truck 108 configured to propel the electric skateboard 100; a first strain gauge 110 attached to a skateboard truck and configured to sense rider weight and center of gravity strain on the skateboard 100 induced by imbalanced forces exerted upon the front truck 106 and rear truck 108; an optional second strain gauge 112 attached to the other truck and configured to sense rider weight and center of gravity strain on rear truck 108 and the deck 101 induced by forces exerted upon the front and rear trucks 106,108; at least one drive motor 102 configured to drive at least one wheel 104, wherein the drive motor(s) 102 are configured to drive the wheels 104 in response to weight imbalance of the deck 101 and rider center of gravity sensed by the strain gauge(s) 110,112, to cause the vehicle 100 to move linearly in response to forces on the front and rear trucks 106,108 and are only (or variably) activated (FIG. 9) by strain gauge 110,112 sensing of the rider's weight as to not activate when there is no rider on the skateboard deck 101 and only when the inertial sensors 114 determine a substantially level vehicle 100.

An inertial balance sensor 114 attached to the deck 101 and configured to sense inclination of the board 100, wherein the drive motor(s) 102 are configured to drive the wheels 104 only when the skateboard 100 is properly oriented in a reasonable riding position, such as substantially level to the ground.

If only a single strain gauge 110 is utilized, a method will be used to allow the rider to zero the strain gauge 110 signal while standing centered on the board deck 101, this tared zero setpoint will be used to determine the difference in the strain gauge 110 measurement from zero and therefore the center of gravity position of the rider.

Many different motor drive methods (FIG. 10-17) may be selected by the rider through means such as a smartphone with a wireless connection.

One such method (FIG. 10,13) is to control the velocity setpoint of the skateboard and rider determined by using the strain gauge(s) to sense the center of gravity (CG) of the rider; wherein, when the CG is sensed toward the forward truck the desired speed will be incremented faster in the speed controller loop; and when the CG is sensed toward the rear truck the desired speed will be decremented slower in the speed controller loop; the rate of increment/decrement may be determined by the amplitude of the CG from center. This method has the advantage of allowing the rider to comfortably stand centered on the board while powering forward at the desired speed. The rider would lean forward to accelerate (increase velocity), lean back to slow down (decrease velocity) until zero speed is reached.

Another control method (FIG. 11, 14) is to use the above described method to sense CG but to increment or decrement a torque set point in a torque controller loop instead of a speed controller loop. The rider would lean forward to increment the commanded torque set point and lean back to decrement the commanded torque set point; the rate of increment/decrement may be determined by the amplitude of the CG from center.

A selectable option would allow advanced riders to, when leaning back, also continue in reverse after zero speed is reached.

Another control method (FIG. 12, 15) is to use the sensed CG to directly control the commanded motor drive torque setpoint. The rider would need to continually lean forward to maintain forward torque and maintain a lean back to apply negative torque.

Another control method (FIG. 16, 17) is to use the sensed CG to directly control the commanded motor drive velocity setpoint. The rider would need to continually lean forward to maintain forward velocity and lean back to reduce velocity.

A manual coasting mode may be selected wherein an inertial sensor attached to the board and configured to sense accelerations from rider pumps (pushes) and inclination of the board, the drive motor(s) being configured to command a motor torque to cause the vehicle to have very little or no drag feeling in the drive train when a rider push is sensed by the inertial sensor or strain gauge(s). The controller in manual mode will be self-powered by regenerated power from the drive motors, the minimal amount of regeneration power is captured to run the controller and allow the low-drag torque control as this mode is useful when the battery has been nearly depleted.

A traction sensing controller is configured to sense the wheel speeds and adjust drive motor torque to keep the wheel rotational velocities relatively similar, especially in situations when one drive wheel has more traction compared to the other which may be sensed by a controller configured to read the strain gauge sensors on the trucks and determine which wheel has more rider weight and therefore more traction.

Figure 7:
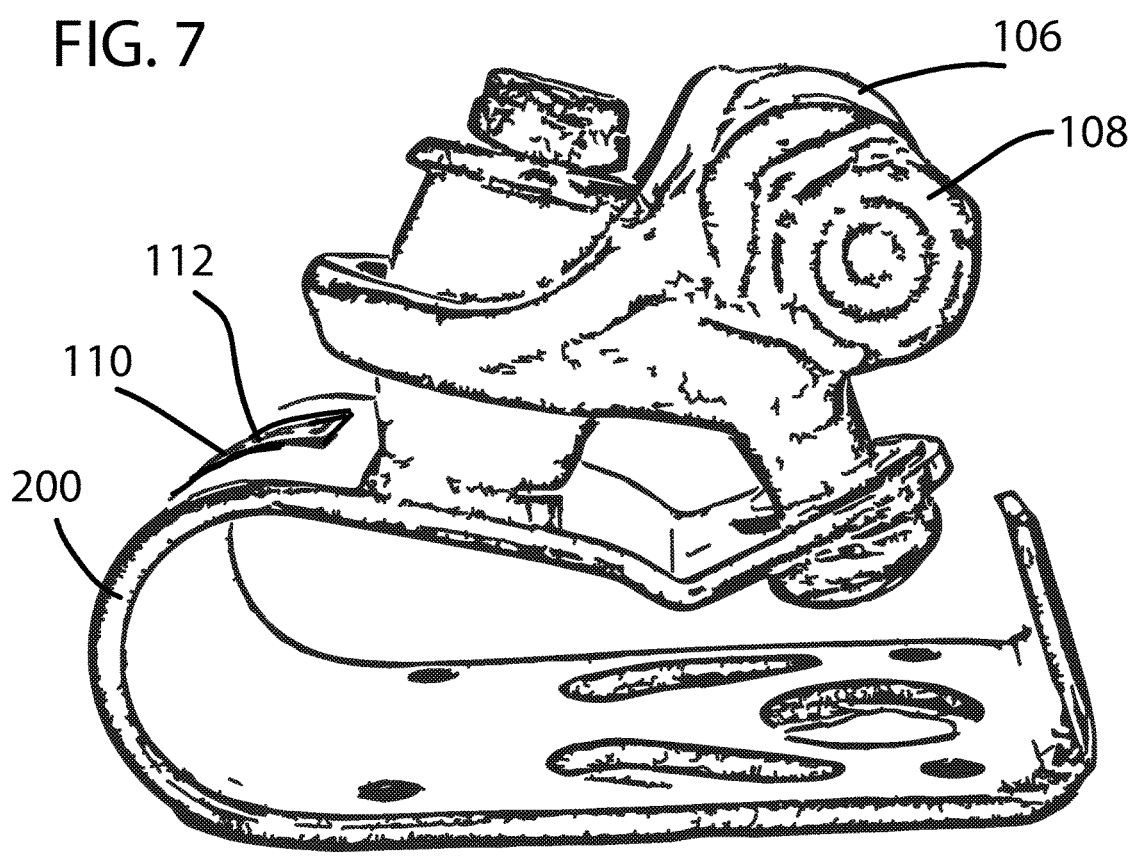
FIG. 7 is an isometric view of a spring steel suspension truck with strain gauge mounted suitable for use in vehicles described herein.
Figure 8:
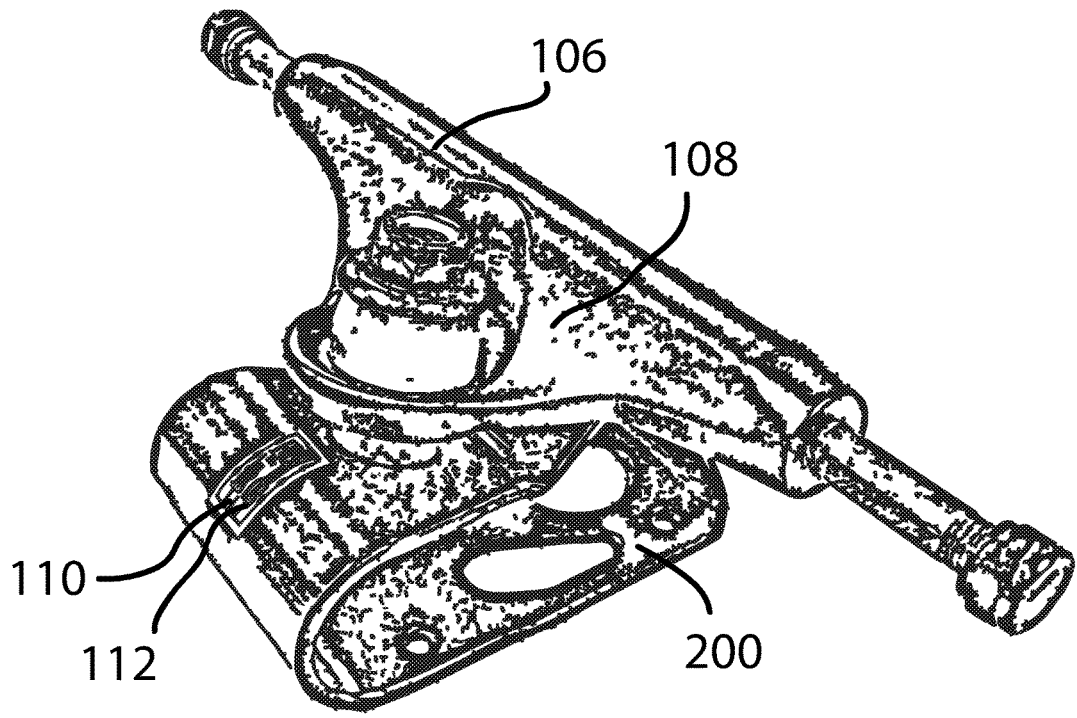
FIG. 8 is a side view of FIG. 7.

Springed suspensions 200 (FIG. 7,8) on the trucks 106, 108 between the wheels and deck are utilized to improve ride comfort, traction, stuck wheels, and reduce rider fatigue. Strain gauges 110,112 may be mounted directly to the spring suspensions 200 to measure the induced stress caused by the rider's weight.

A folding deck configured to hinge near the middle with one truck nesting in front or behind the other truck improves portability.

Features, functions, and advantages may be achieved independently in various embodiments of the present disclosure, or may be combined in yet other embodiments, further details of which can be seen with reference to the following description and drawings.

The rider weight measurement may also be used to set the aggressiveness of the proportional-integral-derivative (PID) speed/torque controller (also referred to as a PID loop) of the motor controller. For example, a softer control may automatically be implemented for lightweight riders, and a stronger, more aggressive control for heavier riders, thereby greatly adding to the safety of the vehicle.

Figure 1:
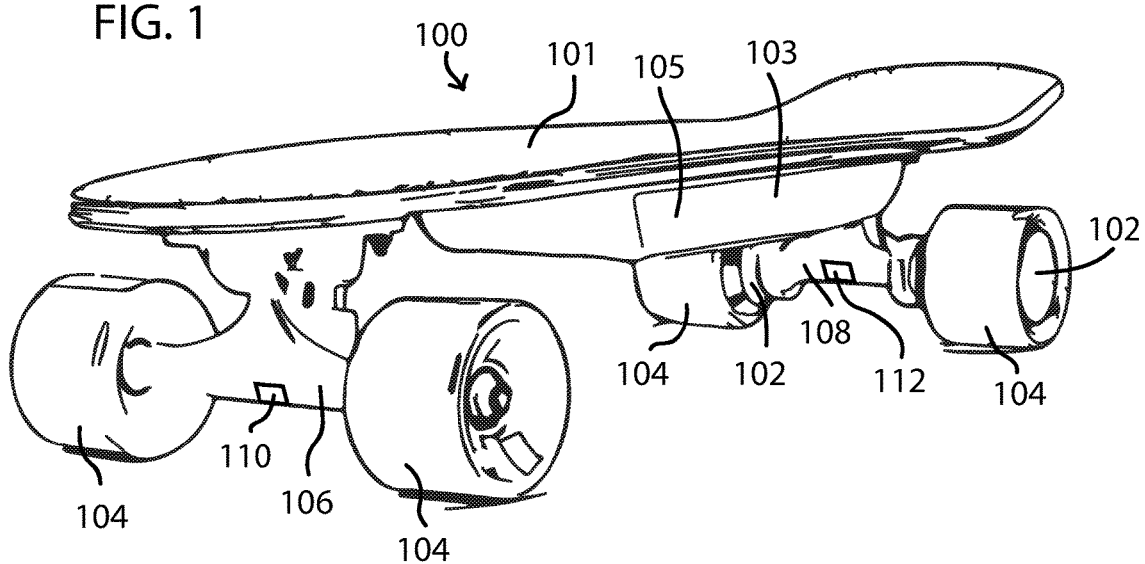
FIG. 1 is an isometric front oblique view of an illustrative four-wheeled weight-sensing electric skateboard having induced-strain rider detection and induced-strain throttle controls in accordance with aspects of the present disclosure.
Figure 2:
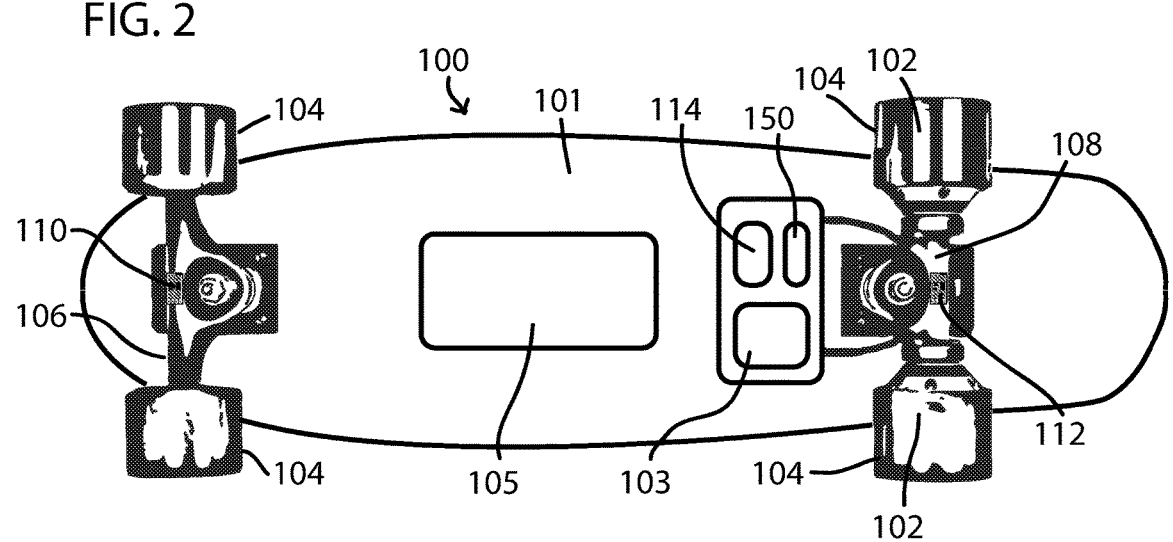
FIG. 2 is a bottom view of the vehicle of FIG. 1.
Figure 3:
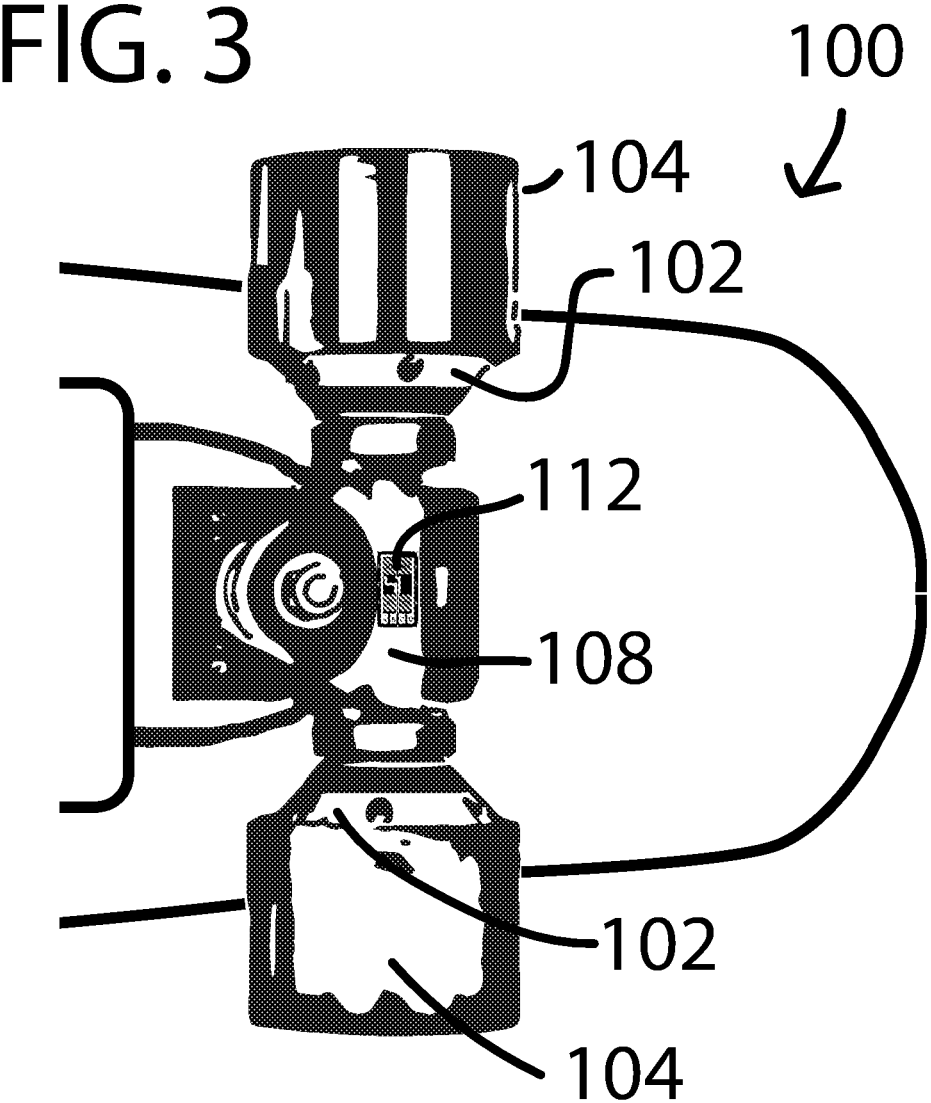
FIG. 3 is a close up view of the rear truck with strain gauge and dual motors of the vehicle of FIG. 1.
Figure 4:
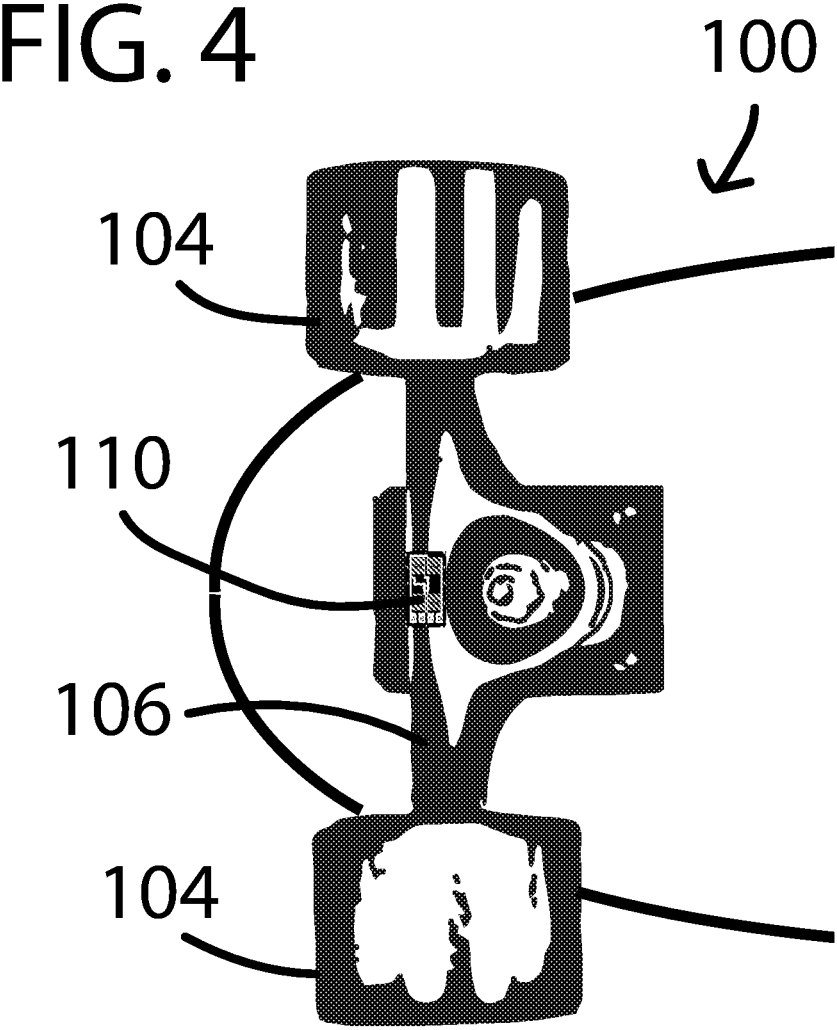
FIG. 4 is a close up view of the front truck with strain gauge of the vehicle of FIG. 1.
Figure 5:
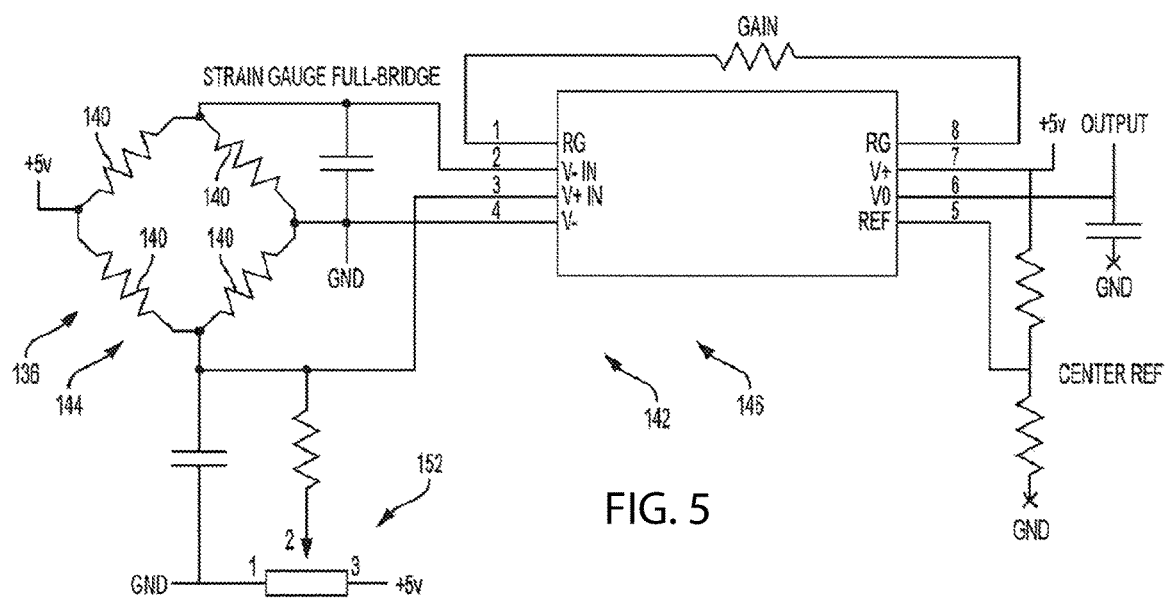
FIG. 5 is a schematic circuit diagram of an illustrative strain gauge sensor and amplification circuit suitable for use in vehicles described herein.
Figure 6:
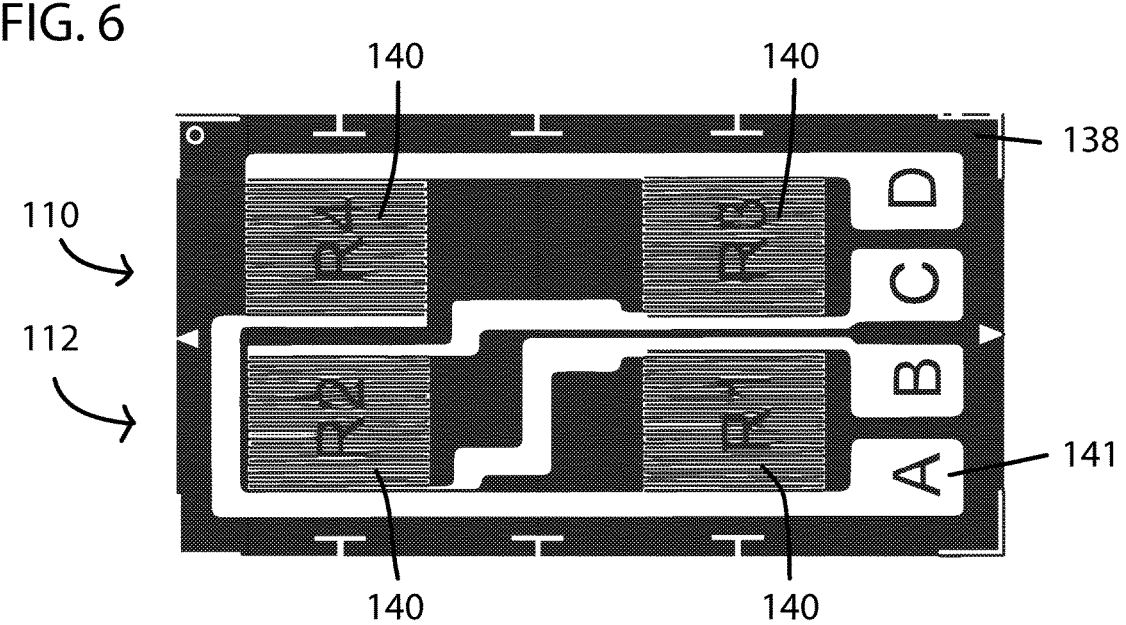
FIG. 6 is a plan view of an illustrative full bridge strain gauge sensor suitable for use in vehicles described herein.

FIG. 6 is a plan view of an illustrative full bridge strain gauge sensor suitable for use in vehicle 100 and others. FIG. 5 is a schematic circuit diagram of an illustrative strain gauge sensor and amplification circuit suitable for use in vehicle 100 and others.

The drive arrangement may use any combination of brushless direct current (i.e., BLDC) hub motors 102 with integrated tires 104. In other examples, a separate wheel and drive motor (brushed or brushless) may be utilized, with power transferred via a chain or belt or transmission. In some examples, a hubless wheel may be driven by a friction drive motor.

An inertial balance position sensor 114 is coupled (e.g., mounted) to deck 101, and configured to sense a tilt position of the vehicle. Balance position sensor 114 may include a combined microelectromechanical systems (MEMS) inertial sensor, such as a six-axis rate gyro and accelerometer. In some examples, sensor 114 is configured to provide a measurement of the position (inclination and inertial movement) of the entire vehicle 100. Sensor 114 is preferably mounted on a circuit board 103 which is attached to deck 101. Sensor 114 may be disposed in any suitable location on the frame. However, a location closer to the center of the vehicle may provide reduced centrifugal force errors caused by vehicle movement.

A rechargeable battery 105 and battery protection circuit is mounted to deck 101 to provide power for the vehicle. Battery 105 may include any suitable power storage device, such as a lithium ion battery.

A first full-bridge strain gauge 110,112 is bonded onto a truck 106,108 of skateboard 100. An example of a full-bridge strain gauge is shown in FIG. 6. Strain gauge 110,112 may include a flexible, insulating substrate 138 supporting one or more conductive foil zig-zag patterns 140. Deformation of pattern 140 changes the electrical resistance of the pattern, which can be measured at leads 141. The change in resistance can then be used to infer the magnitude of induced stress, according to known methods.

Strain gauge 110,112 may be located at or near center region of truck 106,108, or anywhere a majority of strain is induced onto the truck caused by the rider's weight. In some examples, a single or half-bridge strain gauge may instead be used. In this example, strain gauge 110,112 is bonded to truck 106,108 longitudinal with the axle on a bottom surface, such that the strain gauge will detect strains from the rider's weight.

Figure 18:
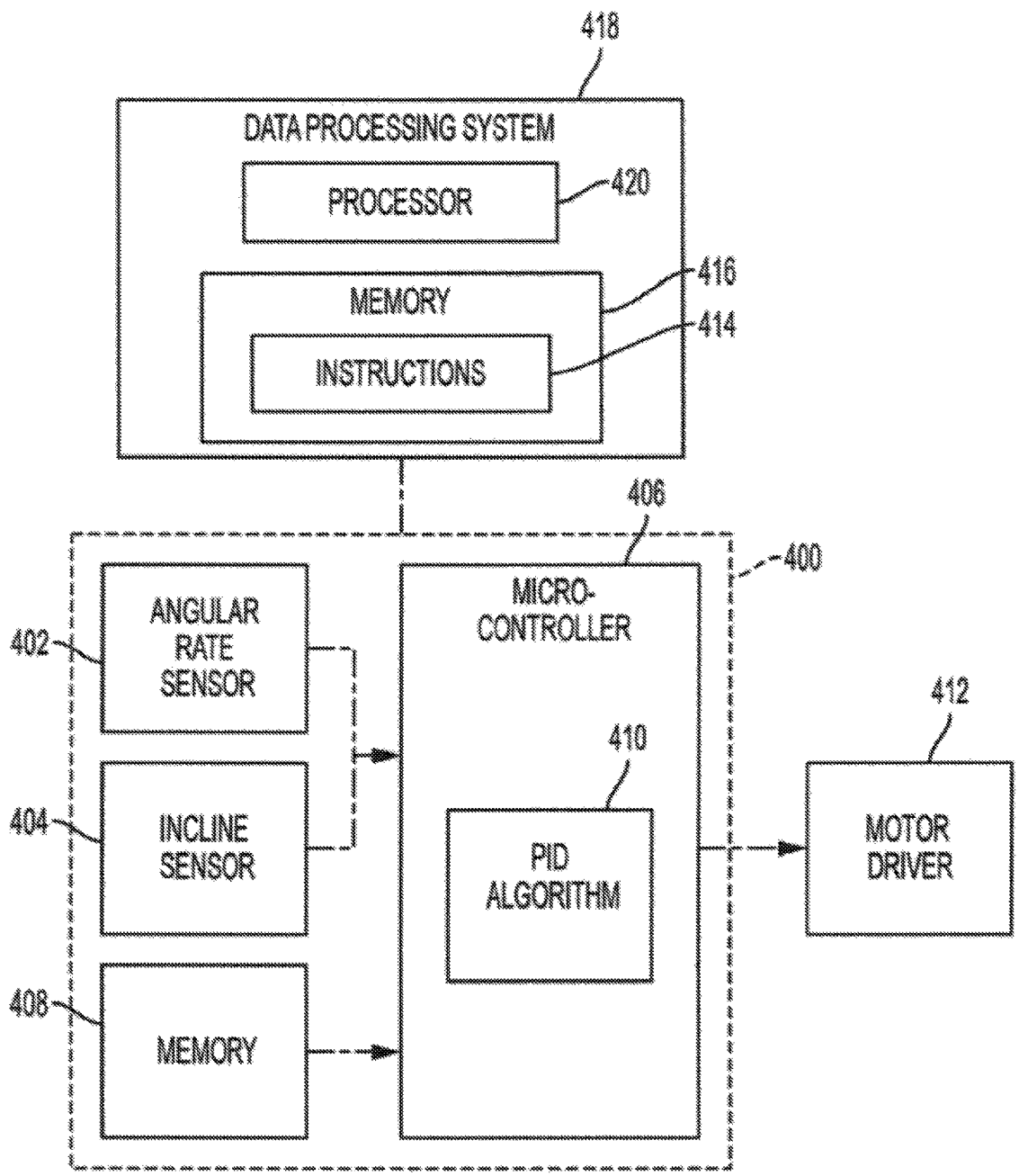
FIG. 18 is a block diagram depicting selected components in an illustrative control system in accordance with aspects of the present disclosure.

As shown in FIG. 5, the analog output of strain gauge 136 may be amplified with an amplifier circuit 142. Circuit 142 may include any suitable amplification components, and is illustrative in nature. The rider's weight on a truck can be derived from the analog voltage, when an operational amplifier is used to detect the voltage shift caused by the strain gauge pairs stretching and/or compressing in response to the induced stresses on the truck. Circuit 142 provides a method for measuring these small voltage changes and supplying an output voltage (corresponding to the rider's weight) to a microcontroller (see FIG. 18). As the rider steps anywhere onto the skateboard deck, a strain is induced and detected by the strain gauge sensor 110,112, thereby indicating when a rider is present and enabling the motor drive system. A magnitude of the induced stress may be proportional to rider weight. This control system may be referred to as the rider-detect system or rider detection. When the rider steps off the vehicle the control system will stop driving the wheels (e.g., by shutting off the motors), such that the vehicle comes to a stop, and/or may disable the motor(s).

The rider's weight may be precisely calculated based on a magnitude of the detected strain, and this weight may be used to adjust the aggressiveness of the throttle control and motor current PID loop. This facilitates a less aggressive control with a lightweight rider and a tighter more aggressive control for a heavier rider, with granular variation in between. This feature increases safety and helps to prevent falls from an overly aggressive system with light rider, or from an underpowered system with heavy rider. In other words, the vehicle's throttle loop will be matched appropriately to the rider's weight, as sensed by the strain gauge(s).

In examples where rider modes are selectable, for example, a new rider may select a more sluggish, less responsive "learning" mode that provides a safer and more comfortable system. Meanwhile, an expert rider may select a very fast and responsive system. In some examples, this rider mode can be communicated to motor controller circuit 103 through a wireless connection device 150 disposed on vehicle 100, such as a Bluetooth Smart (also known as BLE) module, e.g., using a smartphone app.

In some examples, vehicle 100 may save in memory the desired settings of each individual rider, e.g., according to his or her measured weight, and/or may recall a previously established profile (e.g., through a wireless connection to a smartphone). Such a profile may include information regarding throttle aggressiveness, maximum speed, and/or the like.

Strain gauges are initially calibrated to center when zero strain is applied to the frame. However, strain gauges have a known tendency for their accuracy to drift over time. In some examples, the control logic of vehicle 100 may calibrate, upon startup, the zero points of any or all strain gauges. The calibration may be averaged and saved in memory over several startup events to prevent inadvertent strain adversely affecting the calibration. Accordingly, as the vehicle is used it will be gradually calibrated with each power-on cycle.

The user may be directed to power the vehicle without any weight or strain applied to the frame, such that at startup the strain gauges can be automatically zeroed/centered to cancel out drift. Drift will be gradual over time, so this power-up calibration may be configured to affect the drift value by a small amount, as to avoid erroneous calibration by an accidental strain applied during startup.

An erroneous calibration may be detected for example if, upon power-up, a very large calibration need is measured. This error will be ignored and the rider may be warned accordingly. A full user-initiated calibration method may be provided as well (e.g., a "tare" button or command).

In some examples, strain gauges may be centered by detecting when a sensor is being quickly saturated while vehicle 100 is ridden. In these examples, the gauge will be slowly centered over time to ensure full movement in both directions. In some examples, center calibration of the zero point of a strain gauge may be achieved using a digital to analog converter (DAC) output of the microcontroller connected to the strain gauge through a high value resistor (e.g., 470K Ohms). This DAC output will essentially replace a potentiometer 152 of circuit 142, 146 (see FIG. 5) and allow the microcontroller to adjust the center points of the strain gauge full bridge system.

In some examples, a remote control feature may be implemented to control vehicle 100 using a portable electronic device (e.g., a smartphone) and installed app or handheld remote, via wireless module 150. This feature may be enabled or disabled by the rider detection circuit, the rider detection weight threshold may be adjusted using the rider's smartphone app and wireless module 150, such that only riders above a certain weight are permitted to use the vehicle (e.g., preventing children from unauthorized use).

Vehicle 100 may further include instructions 414 stored in a memory 416 of a data processing system 418 (e.g., a personal computer) having its own processor 420. Instructions 414 may be supplied to computer 418 as a download from a computer network (e.g., the Internet) or on a physical medium (e.g., on a portable memory storage device such as a thumb drive, CD, or DVD). Control system 400 may be configured to connect to computer 418, which may upload instructions 414 to vehicle 100. Instructions 414 and computer 418 may provide for modification of instructions or parameters stored in memory 408 of the balance control system. Control system 400 may connect to computer 418 through wired or wireless methods, e.g., by a data cable or by a wireless connection using radio frequency signals and protocols, or by other suitable wireless means.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electric skateboard, comprising:
a deck for a rider;
ground contacting wheels;
a drive motor configured to drive a ground contacting wheel;
a first strain gauge attached to the skateboard and configured to sense induced strain exerted upon the deck;
a speed controller, with a speed setpoint which is configured to increment and decrement in response to the sensed induced strain; and
an inertial sensor configured to sense a push exerted on the skateboard;
wherein the drive motor is configured to, in response to the sensed push, enter a manual mode wherein the drive motor commands a motor torque causing the electric skateboard to have reduced drag feeling.

2. The electric skateboard of claim 1, further comprising a second strain gauge attached to the skateboard and configured to sense strain in the deck induced by the rider's weight exerted upon the deck.

3. The electric skateboard of claim 1, wherein the drive motor is configured to drive the ground contacting wheel with the speed controller responding to the speed setpoint incremented or decremented by a rider position.

4. The electric skateboard of claim 1, wherein the drive motor is configured to drive the ground contacting wheel with a torque controller responding to a torque setpoint incremented or decremented by a rider position.

5. The electric skateboard of claim 1, wherein the drive motor is configured to drive the ground contacting wheel with a torque controller responding to a torque determined by a rider position.

6. The electric skateboard of claim 1, wherein the drive motor is configured to drive the ground contacting wheel with a velocity controller responding to a velocity determined by a rider position.

7. The electric skateboard of claim 1, wherein a balance position sensor enables the drive motor.

8. The electric skateboard of claim 1, wherein a strain gauge induced stress threshold enables the drive motor.

9. The electric skateboard of claim 1, wherein the skateboard is powered by regenerated motor power to activate a near zero torque motor control.

10. The electric skateboard of claim 1, wherein the electric skateboard has a sprung suspension between the ground contacting wheel and the deck.

11. The electric skateboard of claim 1, wherein the skateboard is at least partially powered by regenerated motor power when the drive motor is in the manual mode.

12. The electric skateboard of claim 1, wherein an aggressiveness of the speed controller is automatically adjusted based on a magnitude of the strain sensed by the first strain gauge.

13. An electric skateboard, comprising:
a platform for a rider;
ground contacting wheels;
battery;
a drive motor configured to drive a ground contacting wheel;
a first strain gauge attached to the skateboard and configured to sense first induced strain exerted upon the front of the platform;
a second strain gauge attached to the skateboard and configured to sense second induced strain exerted upon the rear of the platform;
a controller configured to determine the rider's weight and center of gravity according to the first induced strain and the second induced strain; and
a motor speed controller, with a speed setpoint which is configured to increment and decrement in response to the rider's center of gravity;
wherein an aggressiveness of the motor speed controller is at least partially determined by the determined rider weight; and
wherein the motor speed controller includes a proportional-integral-derivative (PID) loop, and the aggressiveness of the motor speed controller comprises an aggressiveness of the PID loop.

14. An electric skateboard, comprising:
a platform for a rider;
ground contacting wheels;
battery;
a drive motor configured to drive a ground contacting wheel;
a first strain gauge attached to the skateboard and configured to sense first induced strain exerted upon the front of the platform;
a second strain gauge attached to the skateboard and configured to sense second induced strain exerted upon the rear of the platform;
a controller configured to determine the rider's weight and center of gravity according to the first induced strain and the second induced strain;
a motor speed controller, with a speed setpoint which is configured to increment and decrement in response to the rider's center of gravity;
wherein an aggressiveness of the motor speed controller is at least partially determined by the determined rider weight; and
further comprising an inertial balance sensor configured to measure an inclination of the skateboard.

15. The electric skateboard of claim 14, wherein a sum of the first induced strain and the second induced strain enables the drive motor.

16. The electric skateboard of claim 14, further comprising a sprung suspension between the ground contacting wheels and the platform.

17. The electric skateboard of claim 16, wherein the speed setpoint is configured to increment and decrement at a rate determined by an amplitude of the center of gravity of the rider from a center portion of the platform.

18. The electric skateboard of claim 14, wherein the skateboard is powered by regenerated motor power to activate a near zero torque motor control.

* * * * *